May 19, 1970 A. BILOTTI 3,513,256

SYNCHRONOUS DEMODULATOR FOR COLOR TELEVISION SIGNALS

Filed March 7, 1969

2 Sheets-Sheet 1

3,513,256

SYNCHRONOUS DEMODULATOR FOR COLOR TELEVISION SIGNALS

Alberto Bilotti, Buenos Aires, Argentina, assignor to Sprague Electric Company, North Adams, Mass., a corporation of Massachusetts Continuation-in-part of application Ser. No. 657,410, July 31, 1967. This application Mar. 7, 1969, Ser. No. 805,151
Int. Cl. H04n 9/50
U.S. Cl. 178—5.4 11 Claims

ABSTRACT OF THE DISCLOSURE

Each of a pair of fully balanced gate detectors are driven by the color subcarrier and one of two color reference signals. One color difference signal is taken from each detector and the third color difference signal is derived in a matrix which combines the antiphase output of each detector. Thermal drift is minimized by a stabilizing network which automatically varies gate current to compensate for thermal variations in the quiescent output voltage.

CROSS REFERENCES TO RELATED APPLICATIONS

The present application is a continuation-in-part of the co-pending application S.N. 657,410 filed in the name of Alberto Bilotti on July 31, 1967.

BACKGROUND OF THE INVENTION

The present invention relates to synchronous demodulators and more particularly to a color demodulator for television receivers.

In color television transmission, the chroma subcarrier carries color information by means of the amplitude of two quadratic carriers and the relative phase of the subcarrier as compared to a reference phase. Hence, a minimum of two synchronous demodulations are required.

In the prior art, these demodulations have generally been accomplished by vacuum tube demodulators or the like which are not fully balanced and are subject to long term parameter drifting, such that the proper circuit operation is difficult to maintain.

It is an object of this invention to provide a highly reliable double-balanced synchronous demodulator for color television reception.

It is another object of this invention to provide a synchronous color demodulator having DC equalization and low thermal drift.

It is a further object of this invention to provide a highly stabilized color demodulator in an integrated arrangement in combination with color killer and blanking circuitry.

It is a still further object of this invention to provide a fully balanced color demodulator combined with a color killer such that gate balance and the quiescent output voltages are not modified by killer operation.

These and other other objects of the invention will be apparent from the following description and claims taken in conjunction with the drawings.

SUMMARY OF THE INVENTION

Broadly, a dual synchronous demodulator provided in accordance with the invention comprises: a first pair of gating means adapted for application of a first signal thereto; a second pair of gating means adapted for application of a second signal thereto; at least one third gating means adapted for application of a third signal thereto; at least one current source; said first and second gating means fed by said third gating means and said current source; a first output means coupled to said first gating means for providing a first output signal therefrom; a second output means coupled to said second gating means for providing a second output signal therefrom; a resistive matrix coupled to both said first and second gating means for providing a third output signal which combines the antiphase of said first and said second output signals; and a third output means coupled to said matrix for providing said third output signal therefrom.

In a more limited sense, the dual synchronous demodulator of the invention comprises a pair of double balanced gate circuits; each of said gate circuits comprising a first and second differential means fed by a third differential means and a current source; a first terminal means in connection to said first and second differential means of said first gate circuit for application of a first reference signal thereto, a second terminal means in connection to said first and second differential means of said second gate circuit for application of a second reference signal thereto, and a third terminal means in connection to said third differential means of both gate circuits for application of an information carrier signal thereto; a first output means in connection to said first gate circuit; a second output means in connection to said second gate circuit; a resistive matrix in connection to both gate circuits for combining the outputs of each detector which are in antiphase to said first and second outputs; said matrix fed by a current source; a third output means in connection to said matrix; and a stabilizing means for controlling the current level of said current sources to provide compensation of the quiescent output voltages against thermal and power supply variations.

DESCRIPTION OF THE PREFERRED EMBODIMENT

Figure 1:
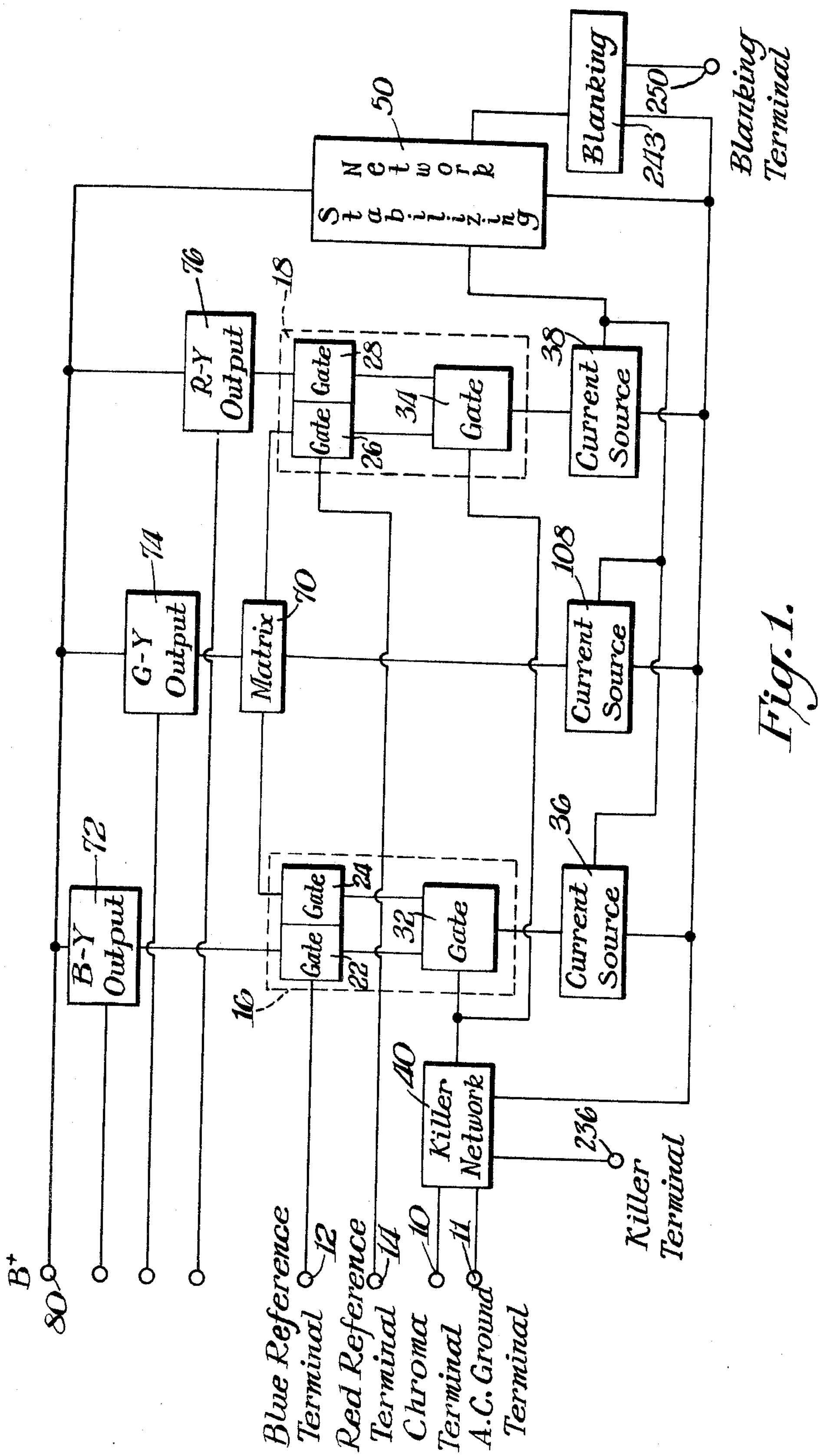
FIG. 1 is a block diagram of a preferred circuit of the color demodulator provided in accordance with the invention.

As shown in FIG. 1, a pair of detector circuits 16 and 18 make up the body of the circuit. Each detector is identical to the other and includes a pair of gate circuits or differential stages 22, 24 and 26, 28 respectively which, in each case, are in series with a third gate 32 and 34 and a current source 36 and 38 respectively. The blue reference signal is applied to gates 22, 24 and the red reference signal to gates 26, 28 of detectors 16, 18 while the chroma signal is applied to both, at gates 32, 34.

The blue color difference signal is taken from gates 22, 24 by output 72, the red from gates 26, 28 through output 76 and the green through output 74 through matrix 70 which combines the outputs of both detectors which are in antiphase to outputs 72 and 76. Matrix 70 is in series with a current source 108 which equalizes output 74 with outputs 72 and 76; the latter being equal due to identical construction. Finally a stabilizing network 50 is provided to control the current level of current sources 36, 38 and 108 to compensate the quiescent output voltages against thermal and power supply variations.

Figure 2:
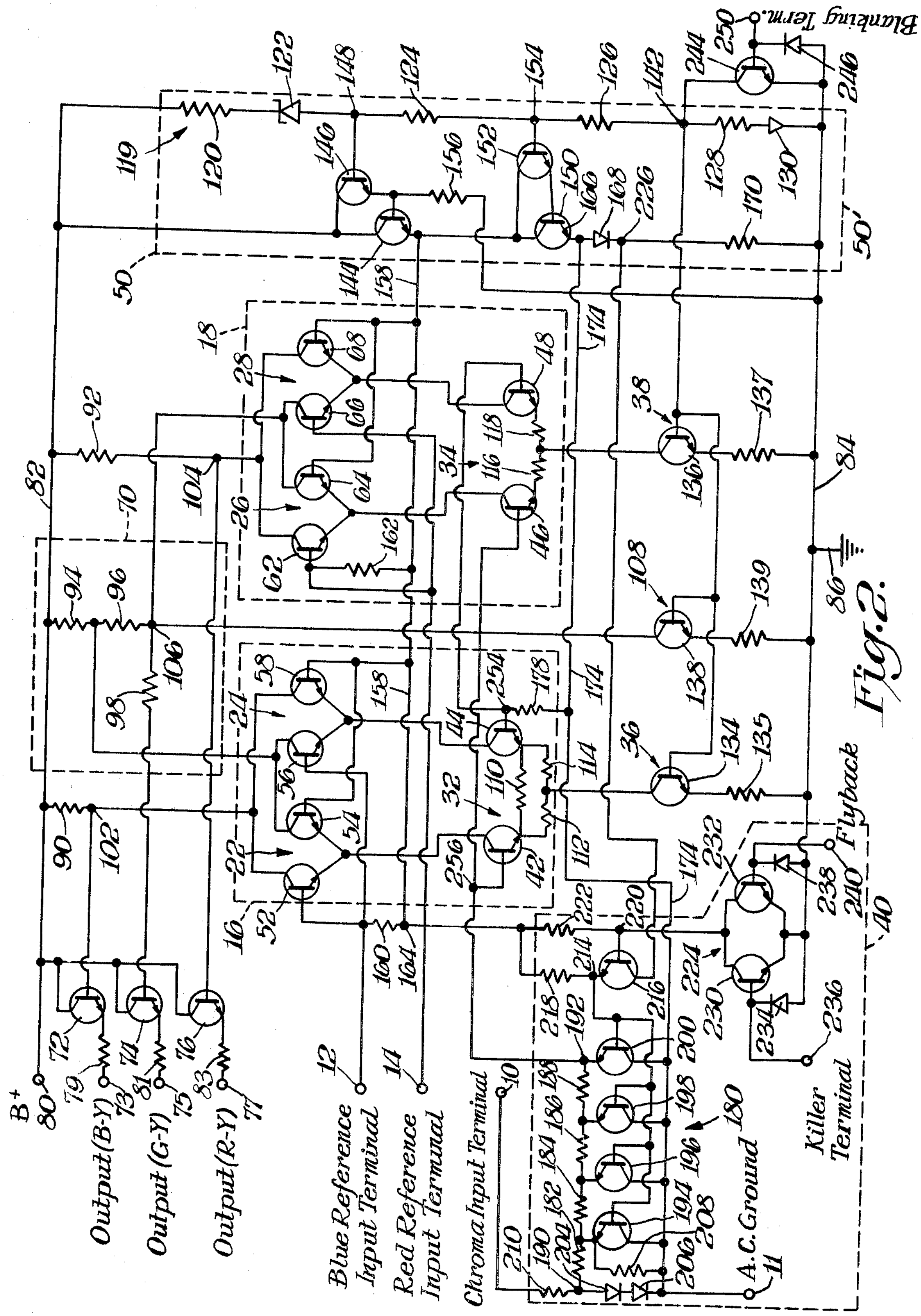
FIG. 2 is a schematic diagram of the demodulator circuit of FIG. 1.

As shown in FIG. 2, four terminals 10, 11, 12 and 14 are provided for signal input to a pair of detector or gate circuits 16 and 18. Except for the addition of emitter resistance in the third gate of circuits 16 and 18, both are identical to gate circuit 90 of the parent application which by reference is incorporated herein. Hence circuits 16 and 18 consist, respectively, of first and second differential transistor pairs 22, 24 and 26, 28 fed by third differential pairs 32, 34 and current sources 36 and 38. Differential pairs 22, 24 provide a first gating means, differential pairs 26, 28 provide a second gating means and differential pairs 32, 34 provide a third gating means.

Circuits 16 and 18 operate as synchronous detectors with the intelligence signal, or chroma signal in this case, applied in common to both circuits through terminal 10 while the reference signals, which are the same in frequency but different in phase, are fed respective detectors through terminals 12 and 14.

The chroma signal, in the preferred embodiment, is applied through a color killer network 40 to the base of transistors 42 and 46 of transistor pairs 32 and 34 respectively, and differentially drives them against transistors 44 and 48 which are controlled by a DC bias from a stabilizing network 50. This DC reference is made available through terminal 11.

The blue reference signal is fed to detector 16 through terminal 12 which applies the signal to the base of transistors 52 and 56, whereas the red reference signal is fed to detector 18 through terminal 14 which applies this signal to the base of transistors 62 and 66. In each case, the reference signals differentially drive these transistors against transistors 54, 58 and 64, 68 respectively which are also DC biased from stabilizing network 50.

Since the detectors are operated as synchronous detectors and the amplitude of the chroma signal should be preserved, the chroma signal gates 32 and 34 operate in the linear mode, i.e., as linear differential amplifiers. However, the reference signal gates (i.e., transistor pairs 22, 24 and 26, 28) are preferably operated in a switching mode such that detector performance is rendered insensitive to the amplitude of the reference signals. Hence, if the saturation voltage or threshold value of the transistors is defined as that voltage at which transistor response becomes non-linear, the reference signals are made to have an amplitude in excess of the saturation voltage whereas, the intelligence signal is made less than the saturation voltage.

In this application we are concerned with reference signals of the same frequency as the chroma subcarrier but different in phase. Parker standards of 3° and 108° reference phase are preferred, however, NTSC standards of 0° and 90° would be suitable, as well as other standards.

The output of the detectors, which are fed through output drivers 72, 74 and 76 provide color different signals B–Y, G–Y and R–Y at terminals 73, 75 and 77 respectively. Each terminal is respectively connected through identical protecting resistors 79, 81 and 83 to the emitter of output transistors 72, 74 and 76.

The blue (B–Y) and red (R–Y) color difference signals are separately derived from detectors 16 and 18 respectively, by combining in each case the collector current of complementary transistors (a driven and a non-driven transistor) of their first and second transistor pairs, while the green color difference signal (G–Y) is derived in a resistive matrix 70 which combines the antiphase output of both detectors.

Each detector and the matrix is connected in series with a separate current source. A DC voltage is applied to each from a terminal 80, which is connected to line 82, and the current source in each case is connected to DC ground line 84. Hence, collector resistance 90 is provided in series from B+ at line 82 to the collectors of transistors 52 and 58 of detector 16. Similarly, resistor 92 is provided in series with collectors of transistors 62 and 68 of detector 18. The collectors of transistors 54 and 56 are connected to the B+ through resistor 94 of matrix 70 while the collectors of transistors 64, 66 are connected through resistors 94 and 96 in the resistive matrix 70.

The output drivers, that is emitter followers 72, 74 and 76, are connected in each case to the low side of the appropriate collector resistance. Hence, transistor 72 is connected at junction 102 to gate circuit 16, while transistor 76 is connected at junction 104 to gate circuit 18, and finally, transistor 74 is connected through resistor 98 to junction 106 of matrix 70. Junction 106 which is connected in series to resistors 94, 96 is also biased by means of a current source 108. The current source 108 provides the required voltage drop through 94 and 96 for equalization of the three output quiescent voltages. For the same reasons, resistor 98 provides equalization of the three small voltage drops developed by the base current of the output transistors 72, 74 and 76.

The gain of each detector circuit is controlled by an emitter resistance, provided in the third differential pair of each. Hence, the emitters of transistors 42 and 44 are connected to current source 36 by identical resistors 112 and 114 whereas in detector 18, transistors 46 and 48 are connected to current source 38 through resistors 116 and 118. Resistor 110 allows a fine adjustment of the gain ratio, especially in the case of integrated monolithic versions. In this way, the gain ratio of both synchronous detectors can be adjusted without any shift in the output quiescent voltages.

Output drivers 72, 74 and 76 are matched in beta and thermally coupled to current source transistors 134, 136 and 138 so that they will thermally track each other. Then thermal stability of the circuit is provided by base current cancellation in which a bias string 119 of network 50 varies the base voltage, that is the emitter current of current source transistors 134, 136 and 138 to offset the thermal variation in base current of output drivers 72, 74 and 76.

Bias string 119 includes a resistor 120, a Zener diode 122, resistors 124, 126, 128 and a diode 130 all connected in series between line 82 and 84, as shown. The bases of transistors 134, 136 and 138 are connected in common to junction 142 which is provided between resistor 126 and 128. Preferably, the temperature coefficients of the resistors of network 50 and collector and matrix resistors are matched and the resistors and other elements are also thermally coupled (for example in the same chip) so as to track in temperature.

The required conditions for desensitizing the quiescent output voltage against power supply variations and against transistor $\beta$ variations due to temperature, can be derived from the simplified analysis that follows. Two circuit loops, both of which include the DC source $V_{cc}$ (not shown) are considered. The first loop is taken through this source and bias string 119. The second loop is taken through the source, one collector resistance (e.g., resistor 90), the base-to-emitter of its output driver and the circuit load which is not shown. For clarity, output resistor 79, is assumed to be included in the load and the resistance of the Zener diode, which is small as compared to the overall resistance of network 50, is assumed to be negligible. Then, consideration of both of these loops provides the following equation:

$$V_Q=(V_{cc}-V_{BE})(1-ka)+\frac{R_c}{\beta}(kbI_{E_1}-I_{E_2})+kaV_z$$

where:

$V_Q$=the quiescent voltage at emitter terminal of the output driver $V_{cc}$=power supply voltage $V_{BE}$=base-emitter voltage drop $R_c$=collector resistance (e.g., resistance 90)

$V_z$=Zener voltage $k=I_c/I_o$=current transfer ratio $I_c$=quiescent collector current of the gate (e.g., total DC current flowing into collectors of transistors 52 and 58)

$I_o$=current through resistor 128

$$a=\frac{R_c}{R_1+R_2}=\text{resistance ratio}$$

$R_1$=resistance 120+resistance 124+resistance 126
$R_2$=resistance 128

$$b=\frac{R_1}{R_1+R_2}=\text{resistance ratio}$$

$I_{E_1}$=total emitter current of the three current sources 36, 38 and 108
$I_{E_2}$=emitter current of output driver=load current
$\beta$=common emitter current gain of all transistors.

In developing the previous formula, we have assumed that $bI_{E_1}/\beta I_0 \ll 1$, a condition that can be easily met in practice.

From the above equation it can be seen that the quiescent voltage $V_Q$ can be desensitized against source voltage ($V_{cc}$) and base-emitter ($V_{BE}$) variations by making $ka=1$ (voltage desensitization). Moreover, assuming all resistors, including the load resistor, have substantially the same temperature coefficient, then temperature stability of $V_Q$ implies desensitization against $\beta$ variations, or: $kb=I_{E_2}/I_{E_1}$ (temperature desensitization).

Appropriate choice of the resistor values allows the fulfilling of either one of the previous stability conditions or of both simultaneously. In this last case, the $V_Q$ expression shows that the quiescent output voltage becomes equal to the Zener voltage $V_Z$.

The same results apply to the quiescent output voltage of the matrix. In fact, the extra-resistor 98 is chosen such that $R98+R96+R94=R90=R92$, and therefore the three voltage drops due to the base current of each output driver are the same. If the biasing current through current source 108 is then adjusted for equal $V_Q$'s, a straightforward analysis shows that the three quiescent output voltages $V_Q$ will track with both temperature and $V_{cc}$ variations, and can be fully stabilized by fulfilling the same two previous conditions.

Stabilizing network 50 also controls the DC level for the chroma and reference signals and provides a low impedance to these signal lines. Thus, transistors 144 and 146, which are coupled to junction 148 of the bias string, provide a constant DC level for the reference signal input; that is the DC voltage level for the first and second differential pair of each detector circuit. Whereas, transistors 150 and 152 which are coupled to junction 154 of bias string 119 provide the chroma DC level of the third transistor pair of each detector.

These transistor pairs 144, 146 and 150, 152 are operated in an emitter follower mode to provide active decoupling. That is each stage provides an active bypass or decoupling which allows a current variation on the signal lines without affecting voltage. Hence the first stage provides a first voltage level while the second stage provides a second voltage level for the gate circuits.

Both collectors of transistors 144 and 146 are connected to B+ at line 82 and the base of transistor 146 is connected to junction 148 while its emitter is connected in common to the base of transistor 144 and to ground through resistor 156. The stage is completed by connection of the emitter of transistor 144 to detectors 16, 18, and through the next decoupling stage to ground 86. Thus, the emitter of transistor 144 is directly connected to the base of transistors 58 and 68 through line 158. Through line 158, it also connects to the bases of transistors 52, 56 and terminal 12 by resistor 160, and to the bases of transistors 62, 66 and terminal 14 through resistor 162. This stage also provides bias voltage to the color killer 40 by connection of line 158 to this network at junction 164.

In the second decoupling stage, the collectors of transistors 150 and 152 are directly connected in common to the emitter of transistor 144 as shown. The base of transistor 152 is connected to junction 154 of bias string 119 and its emitter is connected to the base of transistor 150. The stage is baised by connection of emitted 166 of transistor 150 to DC ground 86 through a series string made up of diode 168 and resistor 170.

The output of the second decoupling stage is coupled to gate circuits 16, 18 by line 174 which extends from emitter 166 to AC ground terminal 11 of color killer network 40, and the base voltage of transistors 44 and 48 are also fixed by a common connection to line 174 through resistor 178. This provides a DC reference voltage for the chroma signal.

Killer network 40, which stops residual color during monochrome transmission, disables the dynamic operation of the demodulator by attenuating the color signal. This is accomplished by attenuator 180 which includes four shunt attenuating stages provided by resistors 182, 184, 186 and 188, connected in series between junction 190 and 192 of network 40 and shunt transistors 194, 196, 198 and 200 connected in an inverted low gain arrangement from each of these resistors respectively to AC ground terminal 11. A pair of serially connected diodes 204 and 206 are connected between junction 190 and AC ground 11, and a resistor 208 is connected between the emitter and collector of the first stage; that is of transistor 194. Junction 190 is connected to chroma terminal 10 through resistor 210, and the chroma signal is applied across terminals 10 and 11, for example, by inductive coupling to these terminals. The bases of each of the attenuating transistors are connected in common to collector 214 of transistor 216. Collector 214 is, in turn, connected through resistor 218 to the first reference voltage level, line 158. The base of transistor 216 is connected at junction 220 to resistor 222 and differential transistor pair 224, and its emitter is connected, in turn, to junction 226 of stabilizing network 50.

Differential pair 224 which controls the operation of killer network 40, includes transistors 230 and 232. These transistors have their emitters connected in common to line 84 (ground 86) and their collectors in connection to junction 220. The base of transistor 230 is connected through diode 234 to line 84 and to terminal 236, which is provided for input of the color killer signal. Similarly, the base of transistor 232 is connected to line 84 through diode 238 and directly to flyback terminal 240.

Killer network 40 operates such that when current is drawn through differential pair 224, for example by applying a positive voltage to terminal 236 or 240, attenuator 180 suppresses the chroma input. This follows, since transistor 216 is "off" (its base is negatively biased) when either transistor 230 or 232 is "on," and hence, current flows from base-to-collector of attenuator transistors 194, 196, 198 and 200 which turns them "on." Consequently, each attenuator resistor (resistors 182, 184, 186 and 188) is shunted to AC ground (terminal 11) and the color signal is killed. When transistor 216 is "on," for example under normal operation, diode 168 provides an extra $V_{BE}$ reverse bias to the four attenuating transistors thereby increasing the maximum allowable value of the chroma signal before distortion starts.

The pair of diodes 204, 206 limits the maximum positive excursion of the chroma input signal at the attenuator input; in this way, the chroma dynamic range during killing operation is greatly increased (attenuation starts degrading first with excessive positive swing due to the low inverse $\beta$ of the transistors). The killing action introduces no voltage changes in any point of the circuit, and avoids transients. Therefore, the quiescent voltage outputs are not effected and the "reference white" is kept constant.

A blanking function is also included in the overall circuit by transistor 244 and diode 246 which are coupled to stabilizing network 50. Transistor 244 is connected at its collector to junction 142 and at its emitter to line 84. Its base is also connected to line 84 through diode 246 and directly to blanking terminal 250. Application of a blanking signal (positive voltage) to terminal 250 to cause transistor 244 to conduct, grounds the bases of current source transistors 134, 136 and 138 which are also connected to junction 142, and stops their current flow. This, in turn, makes the output resistors (resistor 90, 92 and 94, 96) rise in voltage to the B+ of terminal 80 which produces a "black" signal at the output terminals.

Typical values of components utilized in the circuit of the drawing are as follows:

B+—24 volts
Resistors 79, 81 and 83—250 ohms
Resistors 90 and 92—14K ohms
Resistor 94—1.64K ohms
Resistor 96—2.28K ohms
Resistor 98—10.08K ohms
Resistor 110—1.5K ohms
Resistors 112, 114, 116 and 118—270 ohms
Resistor 120—14.2K ohms
Zener diode 122—8 volts
Resistor 124—4.7K ohms
Resistor 126—5.2K ohms
Resistor 128—1.35K ohms
Resistors 135 and 137—675 ohms
Resistor 139—630 ohms
Resistor 156—5K ohms
Resistors 160, 162 and 178—2K ohms
Resistor 170—900 ohms
Resistors 182, 184, 186, 188 and 210—300 ohms
Resistor 208—1.1K ohms
Resistor 218—1.9K ohms
Resistor 222—10K ohms The transistors and diodes employed throughout the chip are identical to the basic transistors of the parent application, and as described in that application the active elements are simultaneously diffused to provide identical diffusion depth and impurity profile. Equal profiles is of course, very important for the beta matching of the output drivers to the current source transistors. In addition, beta tracking must also be provided by thermal coupling between them, for example by diffusion within the same chip or the like.

The diode elements are provided by conventional means. Thus all diodes utilize regions similar to those employed in the transistors. For example, diodes 234, 238 and 246 employ emitter isolation diodes (where an emitter region is formed in the isolation walls of the chip), diodes 206 and 130 uses a collector-base junction, Zener diode 122 emlpoys base-emitter junction, and diode 168 utilizes a shorted base-collector structure as in the parent application.

In the specific example, an 8 volt Zener diode was employed. For full desensitization against supply voltage variations a 14 volt Zener diode would be utilized. Of course, the overall resistance of the stabilizing network given in the example would have to be modified slightly in accordance with the increased voltage drop of this diode. With the specific values of the example, thermal stability of better than 2 m.v./C.° was achieved over the temperature range of 25° to 75° with a load resistance (not shown) of 3K ohms at each output.

The circuit can also be utilized without its integrated color killer network 40. In this case, network 40 is eliminated and the chroma signal can be applied either between junctions 256 and 254, or between junction 256 and ground (terminal 86). In this last case, terminal 11 should be preferably AC decoupled.

Many different circuit arrangements are possible. The circuit can be also employed with or without the blanking arrangement, for example. The voltage level of the reference signal gates may also be set from other than stabilizing network 50, and the bias string provided for $\beta$ stabilization, or thermal desensitization, may be provided in any number of ways.

It is also possible to combine both gate circuits 16 and 18 such that the third differential transistor pair and current source of each is provided by a single transistor pair fed by a single current source. This then provides a first and second gating means fed by a third gating means and a current source which may be operated with a stabilizing network similar to that shown. However, crosstalk is to be expected in this case for some applications.

What is claimed is:

1. A synchronous demodulator comprising: a first pair of gating means adapted for application of a first signal thereto; a second pair of gating means adapted for application of a second signal thereto; at least one third gating means adapted for application of a third signal thereto; at least one current source; said first and second gating means fed by said third gating means and said current source; a first output means coupled to said first gating means for providing a first output signal therefrom; a second output means coupled to said second gating means for providing a second output signal therefrom; a resistive matrix coupled to both said first and second gating means for providing a third output signal which combines the antiphase of said first and said second output signals; and a third output means coupled to said matrix for providing said third output signal therefrom.

2. The demodulator of claim 1 wherein said gating means are included in a pair of double balanced gate circuits; each of said gate circuits including a first and second differential means fed by a third differential means and a current source; a first input terminal means in connection to said first and second differential means of said first gate circuit for application of a first reference signal thereto, a second input terminal means in connection to said first and second differential means of said second gate circuit for application of a second reference signal thereto, and a third input terminal means in connection to said third differential means of both gate circuits for application of an information carrier signal thereto; said first output means in connection to said first gate circuit; said second output means in connection to said second gate circuit; said resistive matrix in connection to both gate circuits for combining the antiphase output; a third current source in connection to said matrix for equalizing the quiescent output voltages of said matrix and gate circuits.

3. The demodulator of claim 2 including a stabilizing network in connection with said current sources for controlling the current level of said gate circuits and said matrix and stabilizing their quiescent output voltages.

4. The demodulator of claim 3 wherein said stabilizing network also provides stabilization of said quiescent output voltages against variations in temperature and the DC input to said demodulator.

5. The demodulator of claim 3 wherein said stabilizing network includes a pair of active bypassing stages, one of said stages providing a constant DC voltage to the control means of said first and second differential means of both gate circuits, and the other stage providing a different constant DC voltage to the control means of said third differential means of both gate circuits.

6. The demodulator of claim 3 wherein each of said output means includes a transistor, each of said current sources includes a transistor, said stabilizing network is a resistive string having a first and second resistive portion, said first resistive portion having a Zener diode whose voltage is approximately equal to the quiescent voltage of said circuit, a collector resistance coupled to each of said gate circuits and said matrix, and the ratio of gate collector current to the current of said second resistive portion times the ratio of collector resistance to overall resistance of the stabilizing network is approximately equal to one so as to stabilize the quiescent output voltage against source variations.

7. The demodulator of claim 3 wherein each of said output means includes a transistor, each of said current sources includes a transistor, and said output transistors and said current source transistors are thermally coupled and matched in beta characteristics, and said stabilizing network includes a bias means for controlling the base current of said current source transistors to provide a gate circuit and matrix current in accordance with the base current of said output drivers thereby stabilizing said demodulator circuit against thermal variations.

8. The demodulator of claim 7 wherein said bias means is a series string having a first resistive portion connected from a DC voltage source to the bases of said current source transistors and a second resistive portion connected from said bases to DC ground, and the ratio of said first resistive portion to the overall resistance of said stabilizing network times the ratio of the gate collector current to the current of said second resistive portion is substantially equal to the ratio of the sum of current source emitter currents to the emitter current of said output transistor.

9. The demodulator of claim 8 including a pair of bypassing stages coupled to said first resistive portion and controlled thereby, the output of one of said bypassing stages coupled to said first and second terminal means for providing a low impedance to said reference signals, and the output of the other of said bypassing stages coupled to said third terminal means for providing a low impedance to said information carrier signal.

10. The demodulator of claim 8 including a blanking network, coupled between the bases of said current source transistors and DC ground, and said blanking network adapted to ground the bases of said current source transistors upon application of a blanking signal to said blanking network.

11. The demodulator of claim 8 including a color killer network coupled between said third input terminal and said gate circuits; said killer network providing an attenuator in series with said third terminal for attenuating said carrier signal upon application of a killer signal to said killer network without modifying the relative and absolute quiescent output voltages and the balance of said gate circuits.

References Cited

UNITED STATES PATENTS

| | | | |
|---|---|---|---|
| 2,877,347 | 3/1959 | Clark. | |
| 3,241,078 | 3/1966 | Jones | 329—50 |
| 3,429,987 | 2/1969 | Altmann. | |

ROBERT L. GRIFFIN, Primary Examiner

R. MURRAY, Assistant Examiner

U.S. Cl. X.R.

329—50